United States Patent
You et al.

(10) Patent No.: US 12,008,937 B2
(45) Date of Patent: Jun. 11, 2024

(54) INFINITELY EXPANDABLE DISPLAY APPARATUS AND DRIVING METHOD THEREOF

(71) Applicant: LG Display Co., Ltd., Seoul (KR)

(72) Inventors: Dong Jun You, Seoul (KR); Min Hoi Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/522,749

(22) Filed: Nov. 9, 2021

(65) Prior Publication Data

US 2022/0208057 A1    Jun. 30, 2022

(30) Foreign Application Priority Data

Dec. 28, 2020  (KR) .......................... 10-2020-0184358

(51) Int. Cl.
G09G 3/20 (2006.01)

(52) U.S. Cl.
CPC ....... *G09G 3/20* (2013.01); *G09G 2300/0842* (2013.01); *G09G 2310/027* (2013.01); *G09G 2310/08* (2013.01); *G09G 2340/0407* (2013.01); *G09G 2356/00* (2013.01); *G09G 2370/16* (2013.01)

(58) Field of Classification Search
CPC ............. G09G 3/20; G09G 2300/0842; G09G 2310/027; G09G 2310/028; G09G 2340/0407; G09G 2356/00; G09G 2370/16
See application file for complete search history.

(56) References Cited

U.S. PATENT DOCUMENTS 10,825,378 B2   11/2020   Kim et al.
11,056,055 B2   7/2021    Chung et al.
(Continued)

FOREIGN PATENT DOCUMENTS

CN    108829367 A    11/2018
CN    110827726 A    2/2020
(Continued)

OTHER PUBLICATIONS

China National Intellectual Property Administration, Office Action, Chinese Patent Application No. 202111570165.9, Dec. 30, 2023, 16 pages.
(Continued)

*Primary Examiner* — Matthew A Eason
*Assistant Examiner* — Sujit Shah
(74) *Attorney, Agent, or Firm* — Fenwick & West LLP

(57) ABSTRACT

An infinitely expandable display apparatus includes a set board outputting image data having a first resolution and a plurality of display circuits connected to one another through an interface circuit based on a cascading scheme to display the image data, each of the plurality of display circuits including an application specific integrated circuit (ASIC) embedded therein, wherein each of the plurality of display circuits includes a plurality of slave display circuits generating unit arrangement coordinate information based on a connection of the interface circuit and a master display circuit scaling the image data having the first resolution based on the unit arrangement coordinate information and transferring the scaled image data to the plurality of slave display circuits.

17 Claims, 14 Drawing Sheets

Seam Size < Pixel Pitch ⟹ Zero Bezel

(56) References Cited

U.S. PATENT DOCUMENTS

| | | | |
|---|---|---|---|
| 11,094,281 B2 | 8/2021 | Wang et al. | |
| 2013/0027431 A1* | 1/2013 | Chu | G06F 3/1446 |
| | | | 345/644 |
| 2015/0268918 A1* | 9/2015 | Fu | G06F 3/1446 |
| | | | 345/661 |
| 2016/0034240 A1* | 2/2016 | Kreiner | G09F 9/3026 |
| | | | 348/383 |
| 2016/0188278 A1 | 6/2016 | Lee et al. | |
| 2019/0384560 A1* | 12/2019 | Seo | H05K 5/0017 |
| 2020/0004491 A1 | 1/2020 | Seo et al. | |
| 2020/0051499 A1 | 2/2020 | Chung et al. | |
| 2020/0225903 A1* | 7/2020 | Cohen | G09G 5/12 |
| 2020/0234628 A1* | 7/2020 | Kim | G09G 3/32 |
| 2020/0258471 A1* | 8/2020 | Wang | G06F 3/1423 |
| 2021/0011820 A1* | 1/2021 | Kim | G09G 3/32 |

FOREIGN PATENT DOCUMENTS

| | | |
|---|---|---|
| JP | 2015-200763 A | 11/2015 |
| KR | 10-2008-0073495 A | 8/2008 |
| KR | 10-2013-0056776 A | 5/2013 |
| KR | 10-2020-0089951 A | 7/2020 |
| KR | 10-2020-0107776 A | 9/2020 |

OTHER PUBLICATIONS

Korean Intellectual Property Office, Office Action, Korean Patent Application No. 10-2020-0184358, Feb. 14, 2024, 16 pages.

\* cited by examiner

Seam Size < Pixel Pitch ⇒ Zero Bezel

| DIVISION | RESOLUTION | Remark |
|---|---|---|
| | WIDTH x LENGTH | |
| Display Unit | 480 x 270 | ASIC DRIVING MINIMUM UNIT |
| Cabinet | 1,920 x 1,080 | SET DRIVING UNIT (16Unit) |

FIG. 13

COORDINATE INFORMATION (1,1)

```
┌─ *[1,2] COORDINATE CALCULATION ──────────────
│ 1) Data RECEPTION Vx1L #1 & #2, T CNT pin CHECK
│    (Vx1L #1 pin high -> Vx1L CNT CONNECTION RECOGNITION)
│ 2) PREVIOUS UNIT COORDINATE INFORMATION+ (0,1)
│      =CURRENT UNIT COORDINATE INFORMATION(1,2)
└──────────────────────────────────────────────
```

 COORDINATE INFORMATION (1,2)

```
┌─ *[2,2] COORDINATE CALCULATION ──────────────
│ 1) Data RECEPTION Vx1L #1 & #2, T CNT pin CHECK
│    (Vx1L #2 pin high -> COORDINATE(0,1)->(1,0))
│ (T CNT pin high -> Image VERTICAL AND HORIZONTAL INVERSION)
│ 2) PREVIOUS UNIT COORDINATE INFORMATION + (1,0)
│      =CURRENT UNIT COORDINATE INFORMATION(2,2)
└──────────────────────────────────────────────
```

 COORDINATE INFORMATION (2,2)

```
┌─ *[2,1] COORDINATE INFORMATION ──────────────
│ 1) Data RECEPTION Vx1L #1 & #2, T CNT pin CHECK
│    (Vx1L #2 pin high ->T CNT pin : high -> Low
│    BACKSIDE COORDINATE (0,1)->(0,-1) LOGIC CHANGE)
│ 2) PREVIOUS UNIT COORDINATE INFORMATION + (0,-1)
│      =CURRENT UNIT COORDINATE INFORMATION(2,1)
└──────────────────────────────────────────────
```

COORDINATE INFORMATION (2,1)

INFINITELY EXPANDABLE DISPLAY APPARATUS AND DRIVING METHOD THEREOF

CROSS-REFERENCE TO RELATED APPLICATIONS

This application claims the benefit of the Republic of Korea Patent Application No. 10-2020-0184358 filed on Dec. 28, 2020, which is hereby incorporated by reference in its entirety.

BACKGROUND

Field of Technology

The present disclosure relates to an infinitely expandable display apparatus capable of being expanded.

Discussion of the Related Art

Recently, large-size displays are being used in various fields such as indoor and outdoor digital advertisements. In order to satisfy the demands for large-size displays, infinitely expandable display apparatuses have been proposed. In the infinitely expandable display apparatuses, a single screen is configured by connecting a plurality of display units, and a screen size may increase depending on the case.

A screen size of each of infinitely expandable display apparatuses is determined based on the number of connections of display units, and image data reproduced by the display units is supplied from a set board. In a case where the number of connections of display units is changed, a resolution matching process between the set board and the display units is necessarily needed. For example, when an output resolution of the set board is not changed based on the number of connections of display units, a screen fading phenomenon or the like occurs, and it is impossible to normally reproduce an image.

SUMMARY

To overcome the aforementioned problem of the related art, the present disclosure may provide an infinitely expandable display apparatus and a driving method thereof, in which display units may reproduce a normal image even without changing an output resolution of a set board.

To achieve these objects and other advantages and in accordance with the purpose of the disclosure, as embodied and broadly described herein, an expandable display apparatus includes: a set board outputting image data having a first resolution; a plurality of display circuits connected to one another through an interface circuit based on a cascading scheme to display the image data, each of the plurality of display circuits including a first application specific integrated circuit (ASIC) embedded therein, wherein the plurality of display circuits comprises: a plurality of slave display circuits generating unit arrangement coordinate information based on a connection of the interface circuit; and a master display circuit scaling the image data having the first resolution on based on the unit arrangement coordinate information and transferring the scaled image data to the plurality of slave display circuits.

In another aspect of the present disclosure, a driving method of an expandable display apparatus, including a plurality of display circuits which are connected to one another through an interface circuit based on a cascading scheme and each of the plurality of display circuits includes an application specific integrated circuit (ASIC) embedded therein, includes: outputting image data having a first resolution to the plurality of display circuits using a set board, generating unit arrangement coordinate information based on a connection of the interface circuit by using a plurality of slave display circuits of the plurality of display circuits, and scaling the image data having the first resolution based on the unit arrangement coordinate information and transferring the scaled image data to the plurality of slave display circuits using a master display circuit included in the plurality of display circuits, wherein the scaled image is displayed by the plurality of display circuits.

In one embodiment, an expandable display apparatus comprises: a circuit configured to output image data having a first resolution; and a plurality of display circuits connected to each other in a cascaded arrangement via an interface circuit, the plurality of display circuits having a second resolution that is different from the first resolution, wherein a first display circuit from the plurality of display circuits is configured to determine a mismatch between the first resolution of the image data and the second resolution of the plurality of display circuits, and scale the image data to have the second resolution rather than the first resolution responsive to the mismatch, wherein the plurality of display circuits are configured to display the scaled image data having the second resolution.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 12 to 14 are diagrams illustrating the principle that unit arrangement coordinate information about display units having a two units (width)*two units (height) size is generated according to an embodiment of the present disclosure;

DETAILED DESCRIPTION

Figures 1, 2:
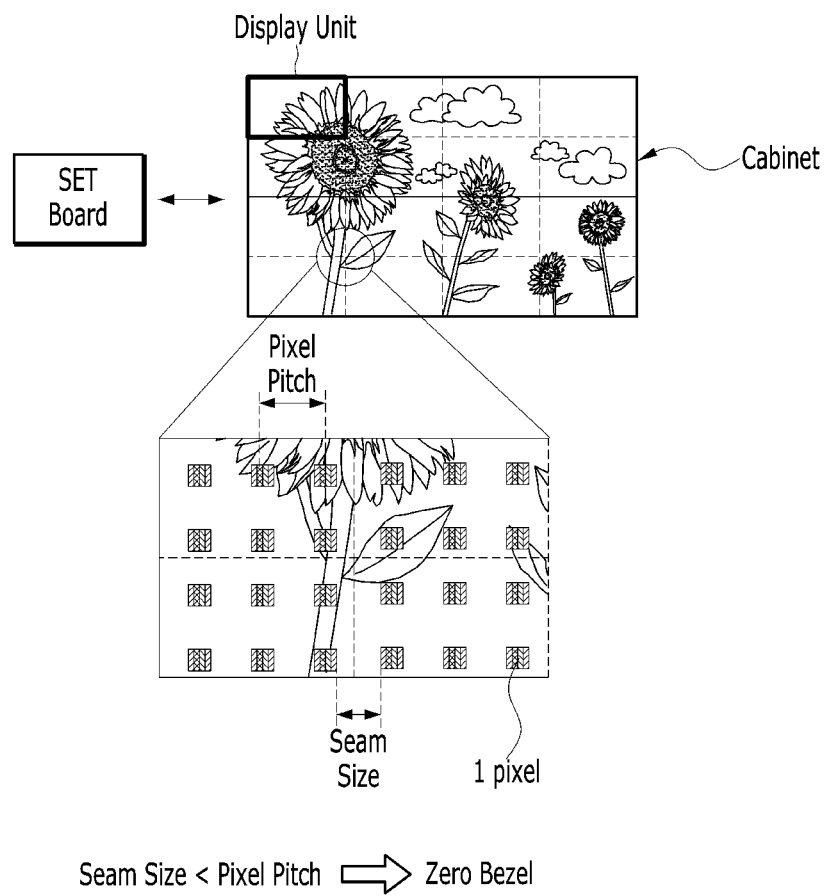
FIG. 1 is a diagram schematically illustrating an infinitely expandable display apparatus according to an embodiment of the present disclosure.
FIG. 2 is a diagram illustrating a resolution based on a unit of driving of the infinitely expandable display apparatus illustrated in FIG. 1 according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on-", "over-", "under-", and "next-", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 3:
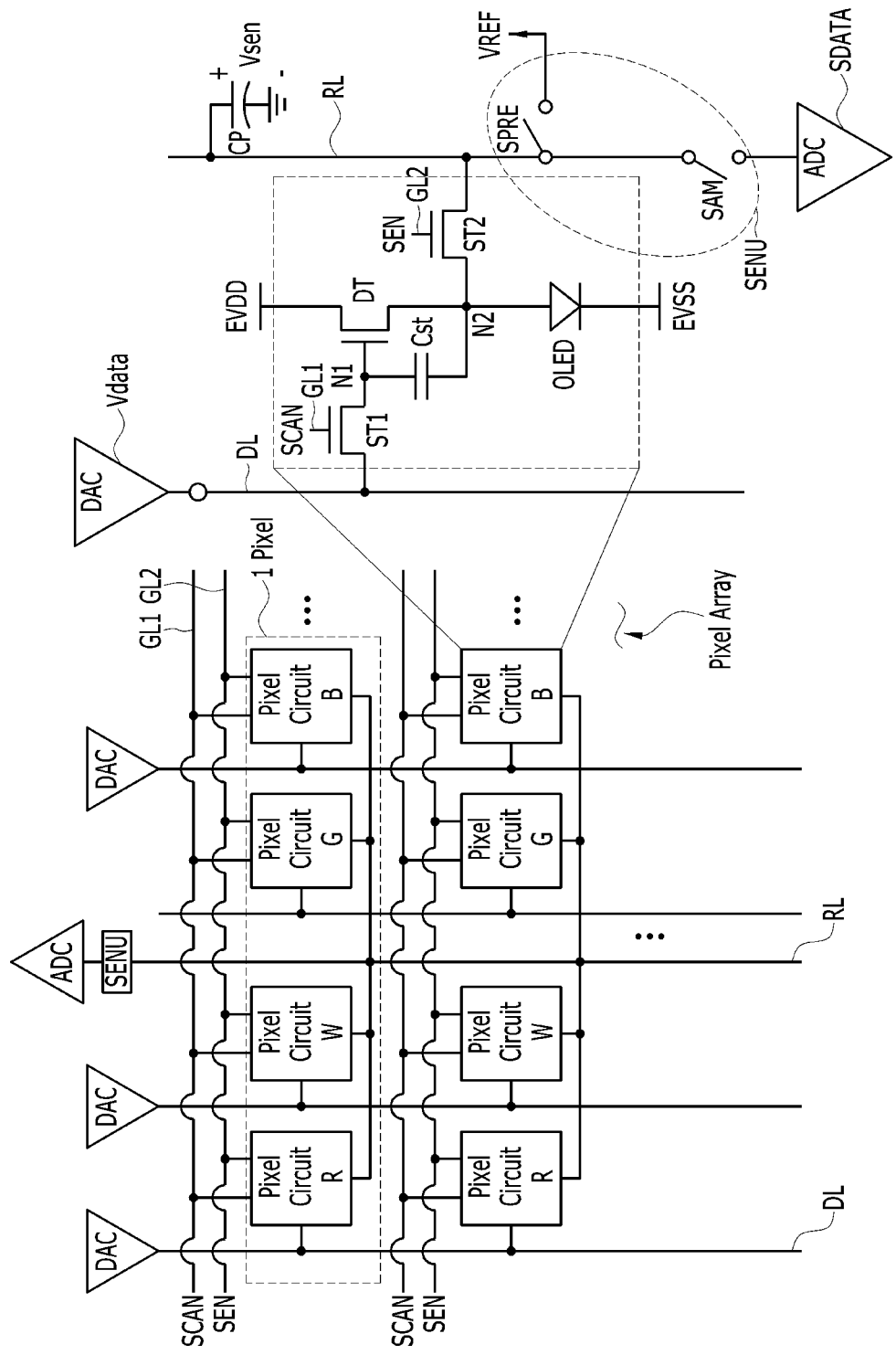
FIG. 3 is a diagram illustrating a configuration of a display unit in an infinitely expandable display apparatus according to an embodiment of the present disclosure.
Figure 4:
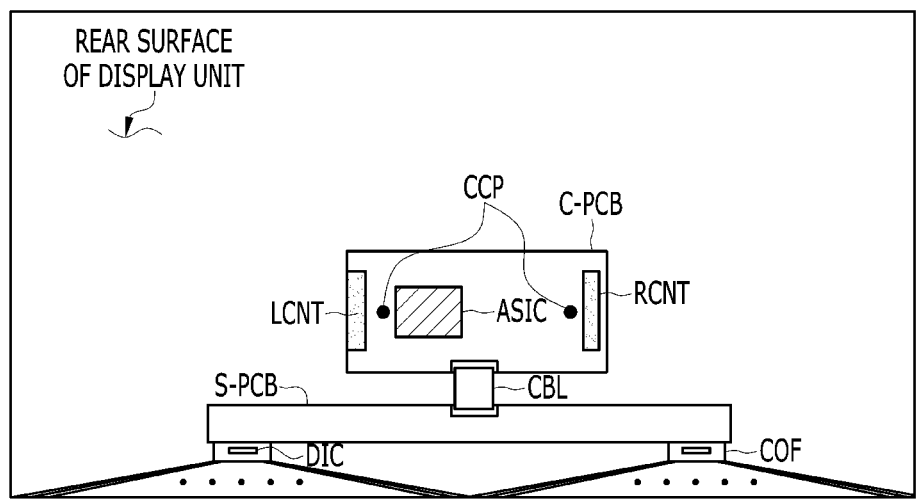
FIG. 4 is a diagram illustrating a configuration of a panel driving circuit of a display unit in an infinitely expandable display apparatus according to an embodiment of the present disclosure.
Figure 5:
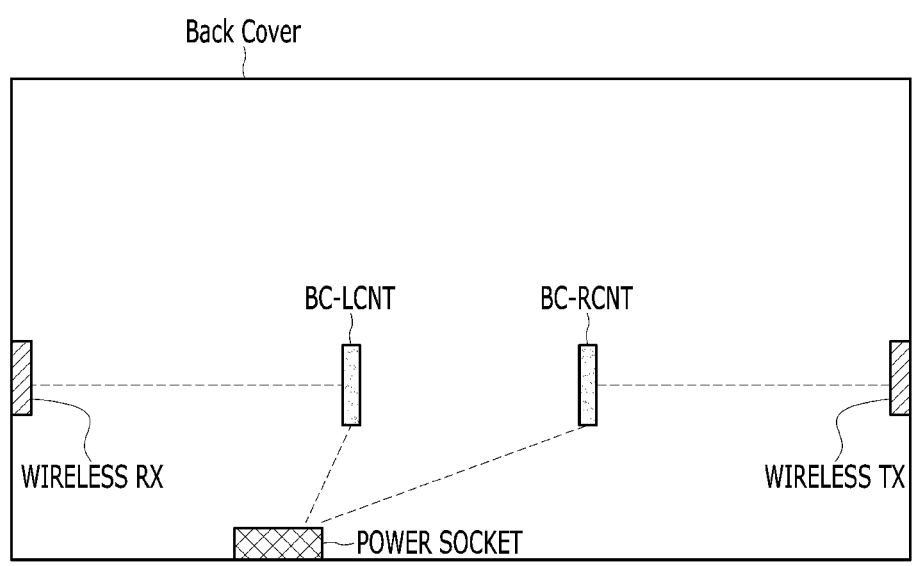
FIGS. 5 and 6 are diagrams illustrating a configuration of a back cover of a display unit in an infinitely expandable display apparatus according to an embodiment of the present disclosure.
Figure 6:
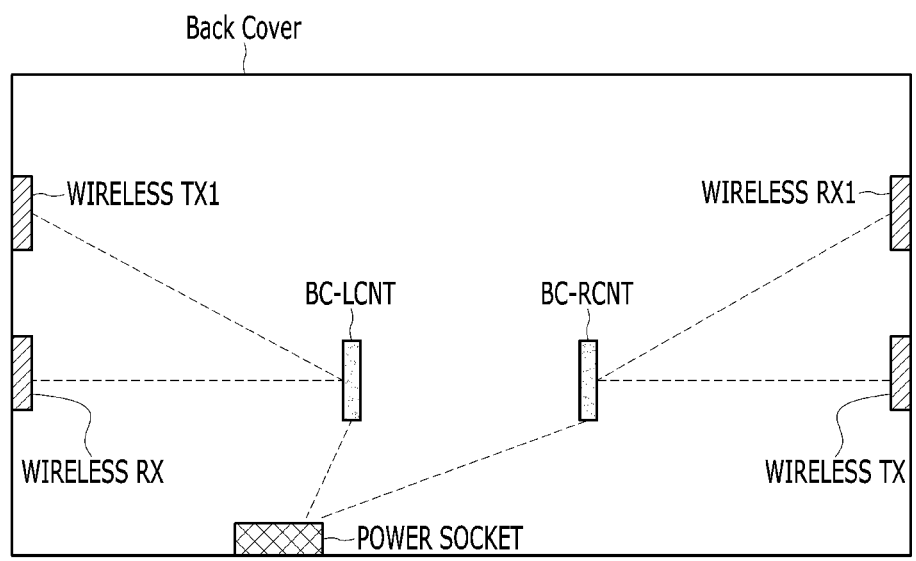

FIG. 1 is a diagram schematically illustrating an infinitely expandable display apparatus according to an embodiment of the present disclosure. FIG. 2 is a diagram illustrating a resolution based on a unit of driving of the infinitely expandable display apparatus illustrated in FIG. 1 according to an embodiment of the present disclosure. FIG. 3 is a diagram illustrating a configuration of a display unit in an infinitely expandable display apparatus according to an embodiment of the present disclosure. FIG. 4 is a diagram illustrating a configuration of a panel driving circuit of a display unit in an infinitely expandable display apparatus according to an embodiment of the present disclosure. Also, FIGS. 5 and 6 are diagrams illustrating a configuration of a back cover of a display unit in an infinitely expandable display apparatus according to an embodiment of the present disclosure.

The infinitely expandable display apparatus according to an embodiment of the present disclosure illustrated in FIG. 1 may include a set board and a cabinet.

The cabinet may include a plurality of display units connected to one another through an interface circuit, and thus, a larger screen than each individual display unit may be configured. A total resolution of the large screen may be determined as a total sum of unit resolutions of the display units. For example, as in FIG. 2, in a case where the cabinet is configured with sixteen display units each having a unit resolution of 480*270, a total resolution of the cabinet may be 1920*1080.

The display units may be based on an electroluminescent display type or a liquid crystal display type, but the technical spirit of the present disclosure is not limited to an implementation type of a display unit. Hereinafter, for convenience of description, an example where a display unit is implemented as the electroluminescent display type will be mainly described in an embodiment of the present disclosure.

In order to realize a zero bezel, an interval (i.e., a seam size) between the display units in the cabinet may be designed to be less than an interval (i.e., a pixel pitch) between pixels. The visibility and readability of a screen may be improved by the zero bezel.

Display units may be connected to one another through an interface circuit based on a cascading scheme and may sequentially transfer image data generated by a set board. In order to reduce the complexity of a communication interface and the manufacturing cost, an interface circuit connecting display units may be implemented based on a wireless scheme. Here, the interface circuit may be a unidirectional interface circuit, or may be a bidirectional interface circuit.

Each of the display units may be an electroluminescent display apparatus which includes a display panel where a plurality of pixels are provided and a panel driving circuit for driving the display panel. The panel driving circuit may include an application specific integrated circuit (ASIC), a data driver, and a gate driver.

The display units may include one master display unit and a plurality of slave display units. An ASIC of the master display unit may include an image scaler embedded therein, and thus, may perform an operation of calculating a physical resolution of each of the display units and an image scaling operation on the display units. Therefore, when a resolution mismatch between the set board and the display units occurs, the display units may reproduce a normal image even without changing an output resolution of the set board.

An ASIC of each of the slave display units may generate unit arrangement coordinate information used to calculate the physical resolution. In one embodiment, the unit arrangement coordinate information for a given slave display unit describes a location of the given slave unit amongst the slave display units in the cascaded arrangement of the slave display units. The unit arrangement coordinate information may be transferred up to a last slave display unit from a first slave display unit on the basis of the cascading scheme, and thus, may be updated. Unit arrangement coordinate information finally updated in the last slave display unit may be fed back to the mast display unit through a feedback loop.

A pixel array illustrated in FIG. 3 may be formed in a front surface of a substrate of a display panel. A plurality of subpixels may be provided in the pixel array, and moreover, a plurality of signal lines for supplying a driving voltage to the plurality of subpixels may be disposed in the pixel array. The signal lines may include a plurality of data lines DL for transferring data voltages Vdata, a plurality of gate lines GL1 and GL2 for transferring gate signals SCAN and SEN, and a plurality of readout lines RL for supplying a reference voltage VREF and sensing a pixel driving characteristic Vsen. Also, the signal lines disposed in the pixel array may further include a driving voltage line for transferring a high level pixel voltage EVDD. In the pixel array, the data lines DL and the readout lines RL may be disposed to extend in a first direction, and the gate lines GL1 and GL2 may be disposed to extend in a second direction intersecting with the first direction. The signal lines may be connected to a pixel circuit of each subpixel and may be connected to a panel driving circuit. Also, a low level pixel voltage EVSS may be supplied to the pixel array. Here, the low level pixel voltage EVSS may be a common voltage which is applied to all of the subpixels. The low level pixel voltage EVSS may be applied as a higher voltage in a sensing mode for detecting a driving characteristic than a display mode for displaying an image.

A plurality of subpixels may configure one pixel. For example, red (R), white (W), green (G), and blue (B) subpixels adjacent to one another in the first direction may configure one pixel. Also, the R, G, and B subpixels may configure one pixel, and in this case, the W subpixel may be omitted in the pixel array. The R, W, G, and B subpixels may merely include different light emitting materials included in light emitting devices thereof and may have substantially the same as configurations of pixel circuits thereof.

Each of the subpixels, as in FIG. 3, may include a light emitting device OLED, a driving thin film transistor (TFT) DT, a plurality of switch TFTs ST1 and ST2, and a storage capacitor Cst. The driving TFT DT and the switch TFTs ST1 and ST2 may each be implemented as an NMOS transistor, but are not limited thereto.

The light emitting device OLED may be a light emitting device which emits light having intensity corresponding to a pixel current input from the driving TFT DT. The light emitting device OLED may be implemented as an organic light emitting diode including an organic light emitting layer, or may be implemented as an inorganic light emitting diode including an inorganic light emitting layer. An anode electrode of the light emitting device OLED may be connected to a second node N2, and a cathode electrode thereof may be connected to an input terminal for the low level pixel voltage EVSS.

The driving TFT DT may be a driving element which generates the pixel current on the basis of a gate-source voltage thereof. A gate electrode of the driving TFT DT may be connected to a first node N1, a first electrode (a drain electrode) may be connected to an input terminal of the high level pixel voltage EVDD, and a second electrode (a source electrode) may be connected to the second node N2.

The switch TFTs (for example, first and second switch TFTs) ST1 and ST2 may be switch elements which set the gate-source voltage and connect the second electrode of the driving TFT DT to the readout line RL.

The first switch TFT ST1 may be connected between the data line DL and the first node N1 and may be turned on based on a first gate signal SCAN applied through a first gate line GL1. The first switch TFT ST1 may be turned on in a setup operation in each of the display mode and the sensing mode. When the first switch TFT ST1 is turned on, a display or sensing data voltage Vdata may be applied to the first node N1. A gate electrode of the first switch TFT ST1 may be connected to the first gate line GL1, a first electrode thereof may be connected to the data line DL, and a second electrode thereof may be connected to the first node N1.

The second switch TFT ST2 may be connected between the readout line RL and the second node N2 and may be turned on based on a second gate signal SEN applied through a second gate line GL2. The second switch TFT ST2 may be turned on in the setup operation in each of the display mode and the sensing mode and may apply the reference voltage VREF to the second node N2. Also, the second switch TFT ST2 may be turned on in performing a sensing operation after the setup operation in the sensing mode and may transfer a source node voltage (or a source voltage) of the driving TFT DT to the readout line RL. Then, a sensing voltage Vsen corresponding to the source voltage may be stored in a parasitic capacitor Cp of the readout line RL. A gate electrode of the second switch TFT ST2 may be connected to the second gate line GL2, a first electrode thereof may be connected to the readout line RL, and a second electrode thereof may be connected to the second node N2.

The storage capacitor Cst may be connected between the first node N1 and the second node N2 and may hold the gate-source voltage of the driving TFT DT during a certain period. In the display mode, the gate-source voltage of the driving TFT DT may be set to a difference voltage between the display data voltage Vdata and the reference voltage VREF, and in the sensing mode, the gate-source voltage of the driving TFT DT may be set to a difference voltage between the sensing data voltage Vdata and the reference voltage VREF.

In the display mode, a pixel current corresponding to the gate-source voltage of the driving TFT DT may flow in the driving TFT DT, and the light emitting device OLED may emit light on the basis of the pixel current. In the sensing mode, the pixel current corresponding to the gate-source voltage of the driving TFT DT may flow in the driving TFT DT, and a source node voltage of the driving TFT DT may vary. The source node voltage may vary based on a driving characteristic of the driving TFT DT, and thus, a driving characteristic variation of the driving TFT DT may be detected based on the sensing voltage Vsen corresponding to the source node voltage. In the sensing mode, the low level pixel voltage EVSS may be applied to be higher than an operation point voltage of the light emitting device OLED, and thus, the pixel current of the driving TFT DT may not flow to the light emitting device OLED and may flow to only the readout line RL. Accordingly, the source node voltage may be reflected as the sensing voltage Vsen in an early time, and thus, sensing reliability may increase.

A configuration and an operation of the subpixel are merely an embodiment, and the technical spirit of the present disclosure is not limited thereto. For example, the first and second gate signals SCAN and SEN may be provided as one signal, and the first and second gate lines GL1 and GL2 may be provided as one signal. Also, the configuration of the subpixel may be designed based on a double rate driving scheme.

In each display unit, as in FIG. 4, an ASIC may be mounted on a control printed circuit board C-PCB and may be disposed on a rear surface of the substrate of the display panel. The control printed circuit board C-PCB may be connected to a source printed circuit board S-PCB through a connection cable CBL. A conductive film COF with a data driver DIC mounted thereon may be bonded to the source printed circuit board S-PCB. Accordingly, the ASIC may be electrically connected to the data driver DIC, and a signal supply path may be formed therebetween. The control printed circuit board C-PCB may include a first connection terminal LCNT and a second connection terminal RCNT for connecting the ASIC to an interface circuit. The first connection terminal LCNT and the second connection terminal RCNT may be connected to back cover terminals BC-LCNT and BC-RCNT provided in back covers of FIGS. 5 and 6, and thus, may connect an ASIC to an interface circuit (i.e., signal transfer/reception terminals TX and RX). A plurality of connection check pins CCP, representing specific logical combination information in connecting the interface circuit, may be connected to the control printed circuit board C-PCB. The connection check pins CCP may be connected between the ASIC and first and second connection terminals LCNT and RCNT. The ASIC of each of the slave display units may calculate a coordinate addition value on the basis of logical combination information about the connection check pins CCP and may add the calculated coordinate addition value to coordinate information about a previous unit, thereby generating coordinate information about a current unit.

One signal reception terminal wireless RX and one signal transfer terminal wireless TX may be installed in the back cover of FIG. 5, so that a unidirectional interface circuit based on a wireless scheme is implemented. The signal reception terminal wireless RX may be wirelessly connected to the signal transfer terminal TX included in a neighbor display unit. Also, the signal transfer terminal wireless TX may be wirelessly connected to the signal reception terminal RX included in another neighbor display unit. The back cover terminals BC-LCNT and BC-RCNT may be electrically connected to a power socket and may be further connected to the signal reception terminal RX and the signal transfer terminal TX through an internal cable. The power socket may be supplied with an input power from the outside. The input power supplied to the power socket may be supplied to the signal reception terminal wireless RX and the signal transfer terminal wireless TX through the back cover terminals BC-LCNT and BC-RCNT and the internal cable. Also, the input power supplied to the power socket may be supplied to the ASIC through the back cover terminals BC-LCNT and BC-RCNT and the first and second connection terminals LCNT and RCNT and may be further supplied to a power circuit. The power circuit may be mounted on the control printed circuit board C-PCB and may process the input power to generate an operation voltage of the data driver DIC, an operation voltage of a gate driver, and operation voltages EVDD and VREF of a pixel. Various operation voltages generated by the power circuit may be supplied to the data driver DIC through the connection cable CBL and the source printed circuit board S-PCB.

Two signal reception terminals wireless RX and wireless RX1 and two signal transfer terminals wireless TX and wireless TX1 may be installed in the back cover of FIG. 6, so that a bidirectional interface circuit based on the wireless scheme is implemented. The signal reception terminal wireless RX may be wirelessly connected to the signal transfer terminal wireless TX included in a neighbor display unit, and the signal transfer terminal wireless TX may be wirelessly connected to the signal reception terminal wireless RX included in another neighbor display unit. Also, the signal reception terminal wireless RX1 may be wirelessly connected to the signal transfer terminal wireless TX1 included in a neighbor display unit, and the signal transfer terminal wireless TX1 may be wirelessly connected to the signal reception terminal RX1 included in another neighbor display unit. The back cover terminals BC-LCNT and BC-RCNT may be electrically connected to a power socket and may be further connected to one of the signal reception terminal RX and the signal transfer terminal TX through an internal cable. The input power supplied to the power socket may be supplied to the signal reception terminals wireless RX and wireless RX1 and the signal transfer terminals wireless TX and wireless TX1 through the back cover terminals BC-LCNT and BC-RCNT and the internal cable. Also, the input power supplied to the power socket may be supplied to the ASIC through the back cover terminals BC-LCNT and BC-RCNT and the first and second connection terminals LCNT and RCNT and may be further supplied to a power circuit. The power circuit may be mounted on the control printed circuit board C-PCB and may process the input power to generate an operation voltage of the data driver DIC, an operation voltage of a gate driver, and operation voltages EVDD and VREF of a pixel. Various operation voltages generated by the power circuit may be supplied to the data driver DIC through the connection cable CBL and the source printed circuit board S-PCB.

The bidirectional interface circuit may be activated in a first transfer direction, and then, may be activated in a second transfer direction opposite to the first transfer direction. While the bidirectional interface circuit is being activated in the first transfer direction, the back cover terminals BC-LCNT and BC-RCNT in the back cover of FIG. 6 may be connected to the signal reception terminal wireless RX and the signal transfer terminal wireless TX through the internal cable. On the other hand, while the bidirectional interface circuit is being activated in the second transfer direction, the back cover terminals BC-LCNT and BC-RCNT in the back cover of FIG. 6 may be connected to the signal reception terminal wireless RX1 and the signal transfer terminal wireless TX1 through the internal cable.

Image data output from the set board may be transferred from a neighbor display unit to the signal reception terminal RX. The image data transferred to the signal reception terminal RX may be supplied to the ASIC through the internal cable, the back cover terminals BC-LCNT and BC-RCNT, and the first and second connection terminals LCNT and RCNT. The ASIC may process the image data into unit image data on the basis of a unit resolution of the display panel, and then, the unit image data may be stored in a memory. Also, the ASIC may supply image data, remaining after processing, to the signal transfer terminal TX through the first and second connection terminals LCNT and RCNT, the back cover terminals BC-LCNT and BC-RCNT, and the internal cable. Then, the signal transfer terminal TX may transfer the image data, remaining after the processing, to another neighbor display unit.

The ASIC may supply the data driver DIC with unit image data and timing control signals synchronized with the unit image data.

The data driver DIC may include a digital-analog converter DAC which generates the data voltage Vdata, a sensing circuit SENU, and an analog-digital converter ADC. In the display mode, the digital-analog converter DAC may convert the image data supplied from the ASIC to generate the display data voltage Vdata on the basis of a timing control signal and may supply the display data voltage Vdata to the data lines DL. In the sensing mode, the digital-analog converter DAC may generate a predetermined sensing data voltage Vdata and may supply the sensing data voltage Vdata to the data lines DL.

In the display mode, the sensing circuit SENU may supply the reference voltage VREF to the readout lines RL. In the sensing mode, the sensing circuit SENU may supply the reference voltage VREF to the readout lines RL and may sample the sensing voltage Vsen charged into the readout lines RL. The sensing circuit SENU may include a reference voltage switch SPRE, connected between the readout line RL and a reference voltage VREF input terminal, and a sampling switch SAM connected between the readout line RL and the analog-digital converter ADC. The reference voltage switch SPRE may be turned on in a setup period of the display mode/sensing mode, and the sampling switch SAM may be turned on in a sampling period of the sensing mode.

The analog-digital converter ADC may digital-process a sampling voltage, generated when the sampling switch SAM is turned on in the sensing mode, to output sensing result data SDATA. The sensing result data SDATA may be the execution result signal based on the driving command signal.

The gate driver may receive an operation voltage and a timing control signal through the data driver DIC. The gate driver may be embedded into a non-display area outside the pixel array of the display panel. The data driver may generate the first and second gate signals SCAN and SEN on the basis of the timing control signal and may supply the first and second gate signals SCAN and SEN to the first and second gate lines GL1 and GL2. In the display mode, the first and second gate signals SCAN and SEN may be for selecting a pixel line to which the display data voltage Vdata is to be applied, and in the sensing mode, the first and second gate signals SCAN and SEN may be for selecting a sensing target pixel line. Here, a pixel line may denote a set of signal lines and pixels adjacent to one another in the second direction.

Figure 7:
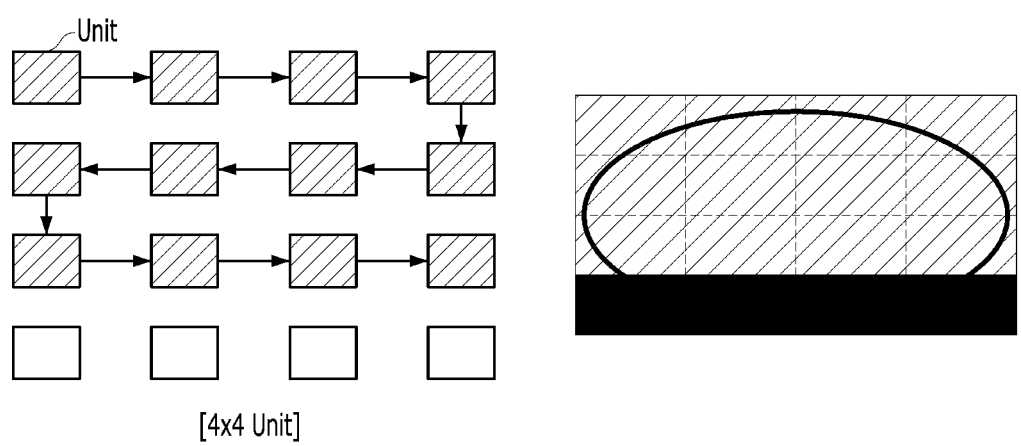
FIG. 7 is a diagram illustrating a screen fading phenomenon occurring due to a resolution mismatch between a set board and display units in a comparative example of the present disclosure.
Figure 8:
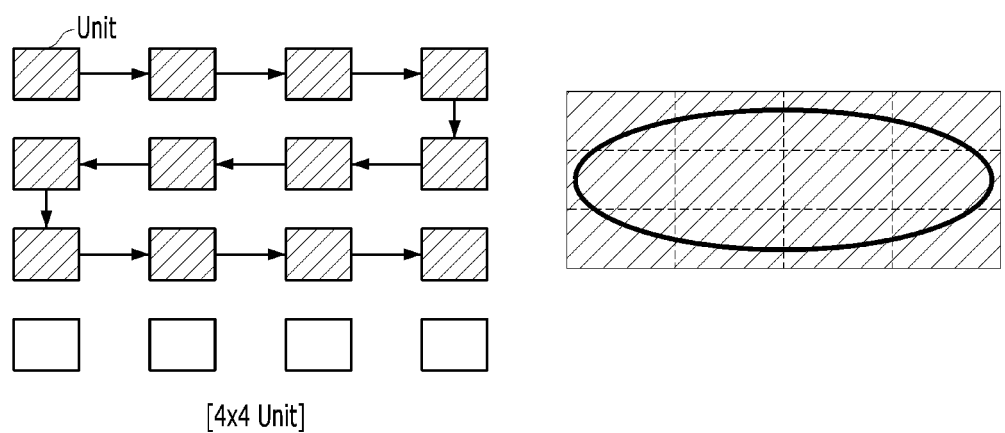
FIG. 8 is a diagram illustrating a case where a normal screen is reproduced despite a resolution mismatch between a set board and display units, in an embodiment of the present disclosure.

FIG. 7 is a diagram illustrating a screen fading phenomenon occurring due to a resolution mismatch between a set board and display units in a comparative example of the present disclosure. FIG. 8 is a diagram illustrating a case where a normal screen is reproduced despite a resolution mismatch between a set board and display units, in an embodiment of the present disclosure.

According to the comparative example of FIG. 7, when a connection between four display units configuring a fourth row is released in a cabinet having a four units (width)*four units (height) screen size, a portion of an output image of a set board may not be displayed in the cabinet and a screen fading phenomenon may occur.

On the other hand, according to an embodiment of FIG. 8, even when a connection between four display units configuring a fourth row is released in a cabinet having a four units (width)*four units (height) screen size, an output image of a set board may be downscaled in the cabinet on the basis of a reduced screen size, and thus, the screen fading phenomenon may not occur. According to an embodiment of the present disclosure, a resolution of an image displayed by the set board may be fixed to an original state regardless of a change (an increase or a reduction) in a screen size, and a specific display unit (i.e., a master display unit) of the cabinet may perform an operation (i.e., an image scaling operation matching a changed screen size) of compensating for a resolution mismatch.

Considering a bandwidth of an interface circuit connecting the set board to the cabinet, the image scaling operation may not be performed by the set board and should be performed by the master display unit. When the image scaling operation is performed by the master display unit, a bandwidth of the interface circuit may be considerably reduced.

Figure 9:
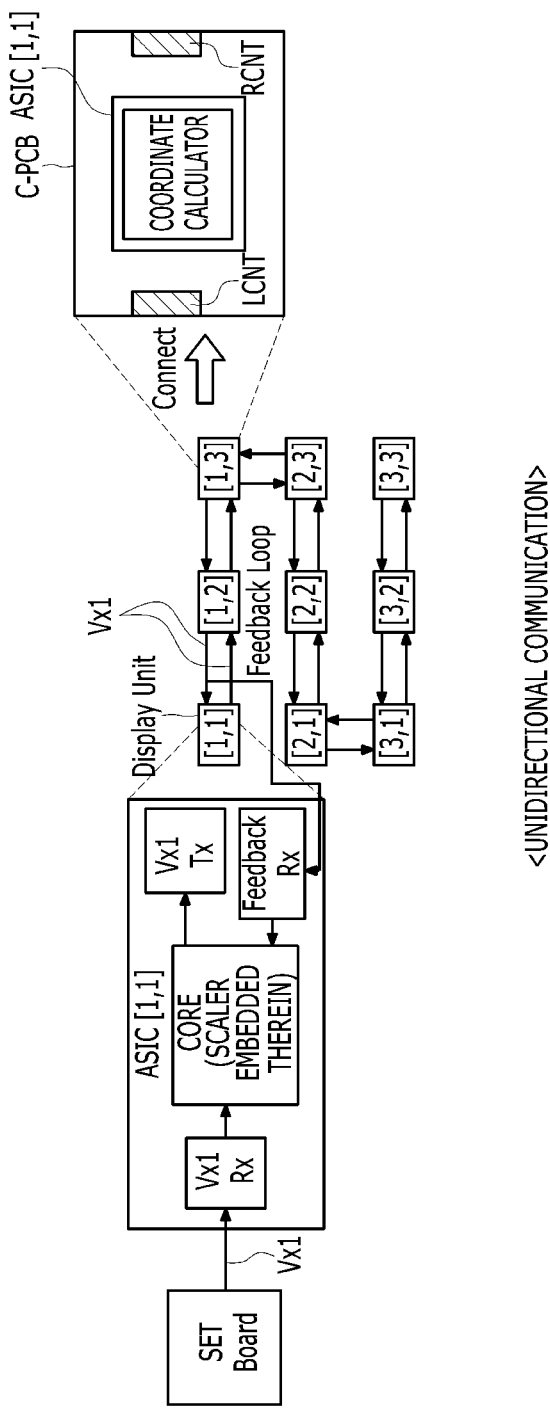
FIGS. 9 and 10 are diagrams illustrating a connection configuration of display units for compensating for a resolution mismatch according to an embodiment of the present disclosure.
Figure 10:
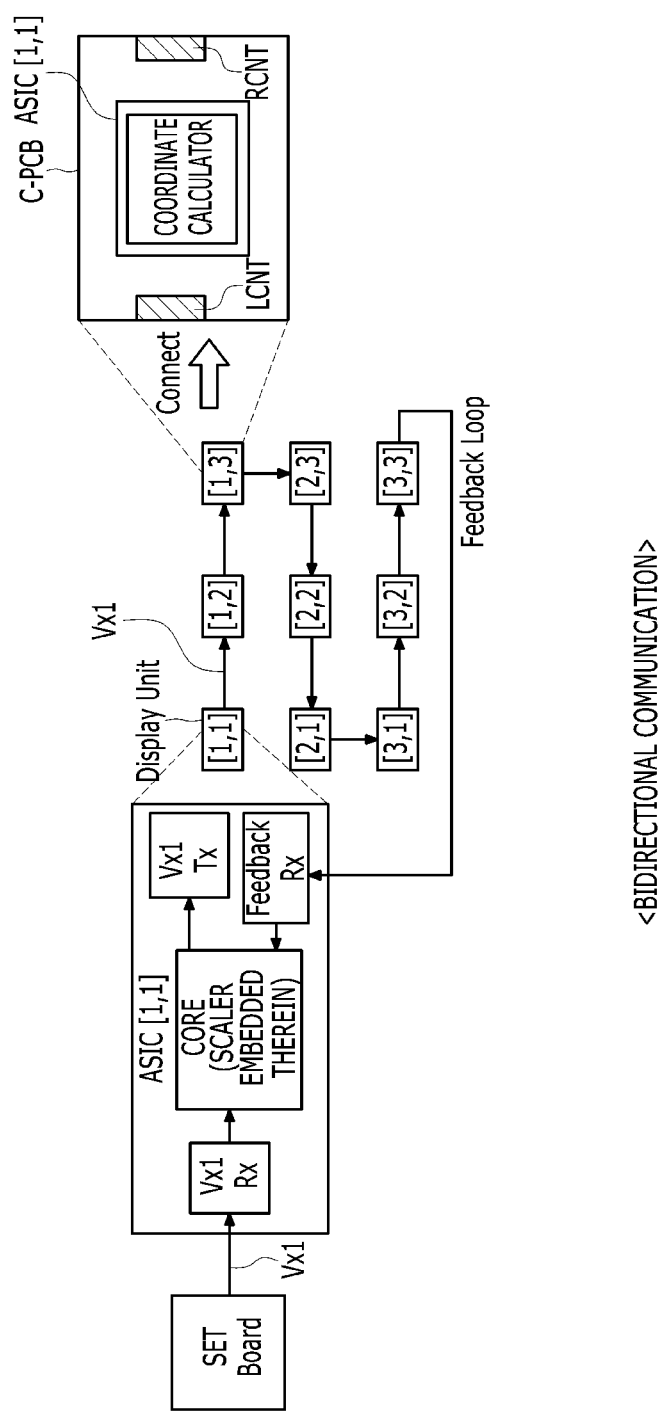

FIGS. 9 and 10 are diagrams illustrating a connection configuration of display units for compensating for a resolution mismatch.

Referring to FIG. 9, in an infinitely expandable display apparatus according to an embodiment of the present disclosure, display units may be connected to one another on the basis of a unidirectional communication scheme based on the cascading scheme. Image data and a sensing command signal transferred from the set board may be transferred and processed sequentially in a signal transfer direction based on a cascading order from a display unit [1,1] to a display unit [3,3].

According to the unidirectional communication scheme, each of the display units may include one signal reception terminal wireless RX and one signal transfer terminal wireless TX, and thus, a communication interface between the display units may be simplified and the manufacturing cost may be reduced. Also, when a communication interface between display units is implemented as a short-distance wireless communication scheme, the simplification effect and convenience of screen expansion may increase. The short-distance wireless communication scheme may be implemented as an infrared scheme, but the present embodiment is not limited thereto.

Referring to FIG. 10, in an infinitely expandable display apparatus according to an embodiment of the present disclosure, display units may be connected to one another on the basis of a bidirectional communication scheme based on the cascading scheme. Image data and a sensing command signal transferred from the set board may be transferred and processed sequentially in a signal transfer direction based on a cascading order from a display unit [1,1] to a display unit [3,3]. According to the bidirectional communication scheme, each display unit may include two signal reception terminals wireless RX and two signal transfer terminals wireless TX.

In FIGS. 9 and 10, the set board may be connected to the display unit [1,1] through a set interface circuit. The set interface circuit may be implemented as a wired or wireless interface circuit. The set interface circuit and the unidirectional interface circuit may be implemented based on a V-by-One (V×1) scheme capable of high-speed and large-capacity interfacing, but are not limited thereto. The set interface circuit may be replaced with another serial communication scheme (for example, serial peripheral interface (SPI), I2C, controller area network (CAN), and universal asynchronous receiver/transmitter (UART)).

In FIGS. 9 and 10, the display unit [1,1] may be a master display unit including a scaler, and the display units [1,2] to [3,3] may be slave display units which generate unit arrangement coordinate information based on a connection of an interface circuit.

The slave display units may include a first slave display unit and a last slave display unit on the basis of a signal transfer direction of the interface circuit, the display unit [1,2] may be the first slave display unit, and the display unit [3,3] may be the last slave display unit. The unit arrangement coordinate information may be a result which is obtained as coordinate information about each slave display unit is updated by sequentially transferring the coordinate information about each slave display unit to the display unit [1,2] to the display unit [3,3] on the basis of the cascading scheme.

Each slave display unit may include a coordinate calculator for generating coordinate information about a current unit, which is to be transferred based on the cascading scheme, a plurality of interface connection terminals LCNT and RCNT for a connection of the interface circuit, and a plurality of connection check pins (see CCP in FIG. 4). The coordinate calculator may be included in a corresponding ASIC. The connection check pins (see CCP in FIG. 4) may represent specific logical combination information in connecting the interface circuit. The coordinate calculator may receive coordinate information about a previous unit through the interface circuit and may calculate a coordinate addition value on the basis of the logical combination information about the connection check pins. The coordinate calculator may add the coordinate addition value to the coordinate information about the previous unit to generate the coordinate information about the current unit and may transfer the coordinate information about the current unit to a next unit through the interface circuit. Based on such a method, the coordinate information about each slave display unit may be transferred from the display unit [1,2] to the display unit [3,3] on the basis of the cascading scheme, and thus, may be sequentially updated.

The display unit [3,3] may be connected to the display unit [1,1] through a feedback loop and may feed back unit arrangement coordinate information (for example, [3,3]), which is a final update result, to the display unit [1,1]. An ASIC of the display unit [1,1] may calculate a physical resolution of each of the display units on the basis of the unit arrangement coordinate information (for example, [3,3]). For example, the unit arrangement coordinate information [3,3] may denote that a screen size of connected display units (i.e., the number of matrixes of the cabinet) is "three units (width)*three units (height)", and thus, the ASIC of the display unit [1,1] may calculate a physical resolution corresponding to the screen size on the basis of unit resolution information about a single unit previously stored in a memory. The ASIC of the display unit [1,1] may scale image data received from the set board on the basis of the physical resolution of each of the display units and may transfer the scaled image data to the slave display units.

An operation of generating and transferring coordinate information by using the display units may be performed in a power on sequence and/or a power off sequence. Therefore, even when physical positions of the display units are switched therebetween for a specific purpose, coordinate information and unit image data may be reallocated based on the switched positions, and thus, the same screen may be displayed. Also, in a power on sequence period and a power off sequence period, an alternating current (AC) power source may be turned on and a direct current (DC) power source may be turned off, an operation associated with generating of coordinate information may be performed in a state where a screen is not reproduced.

Figure 11:
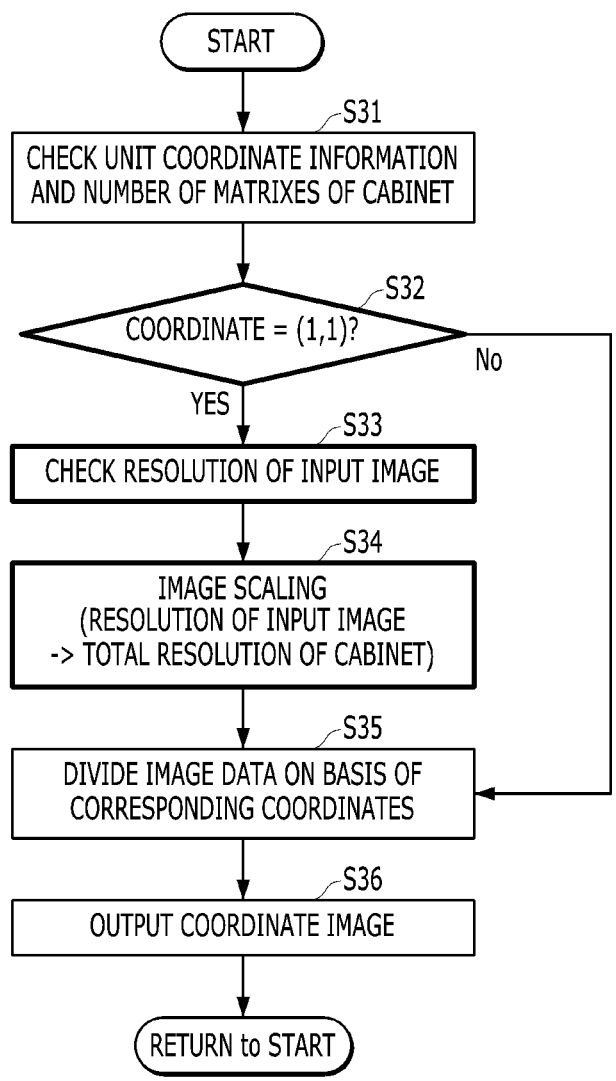
FIG. 11 is a diagram illustrating an operation order of display units for compensating for a resolution mismatch according to an embodiment of the present disclosure.

FIG. 11 is a diagram illustrating an operation order of display units for compensating for a resolution mismatch according to one embodiment.

Referring to FIG. 11, a master display unit may check the number of matrixes of a cabinet on the basis of unit arrangement coordinate information fed back from slave display units and may calculate a total resolution of the cabinet. Also, the master display unit may check a resolution of an input image received from the set board, and then, when the resolution of the input image does not match the total resolution of the cabinet, the master display unit may scale the resolution of the input image on the basis of the total resolution of the cabinet and may transfer the scaled image data to the slave display units (S31 to S34).

Referring to FIG. 11, each of the slave display units may divide the scaled image data into unit image data on the basis of corresponding coordinate information and may output the divided image data as a corresponding coordinate image (S35 and S36).

Figure 12:
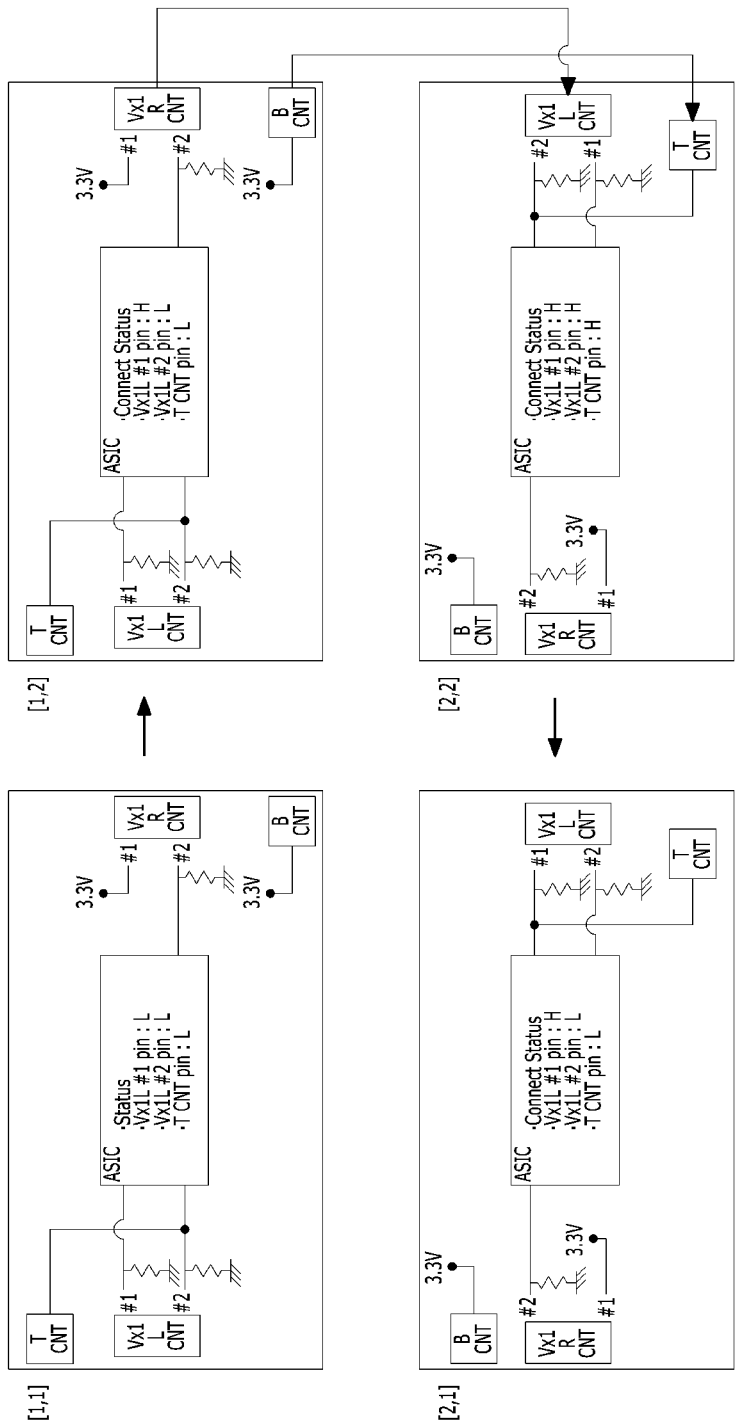
Figure 14:
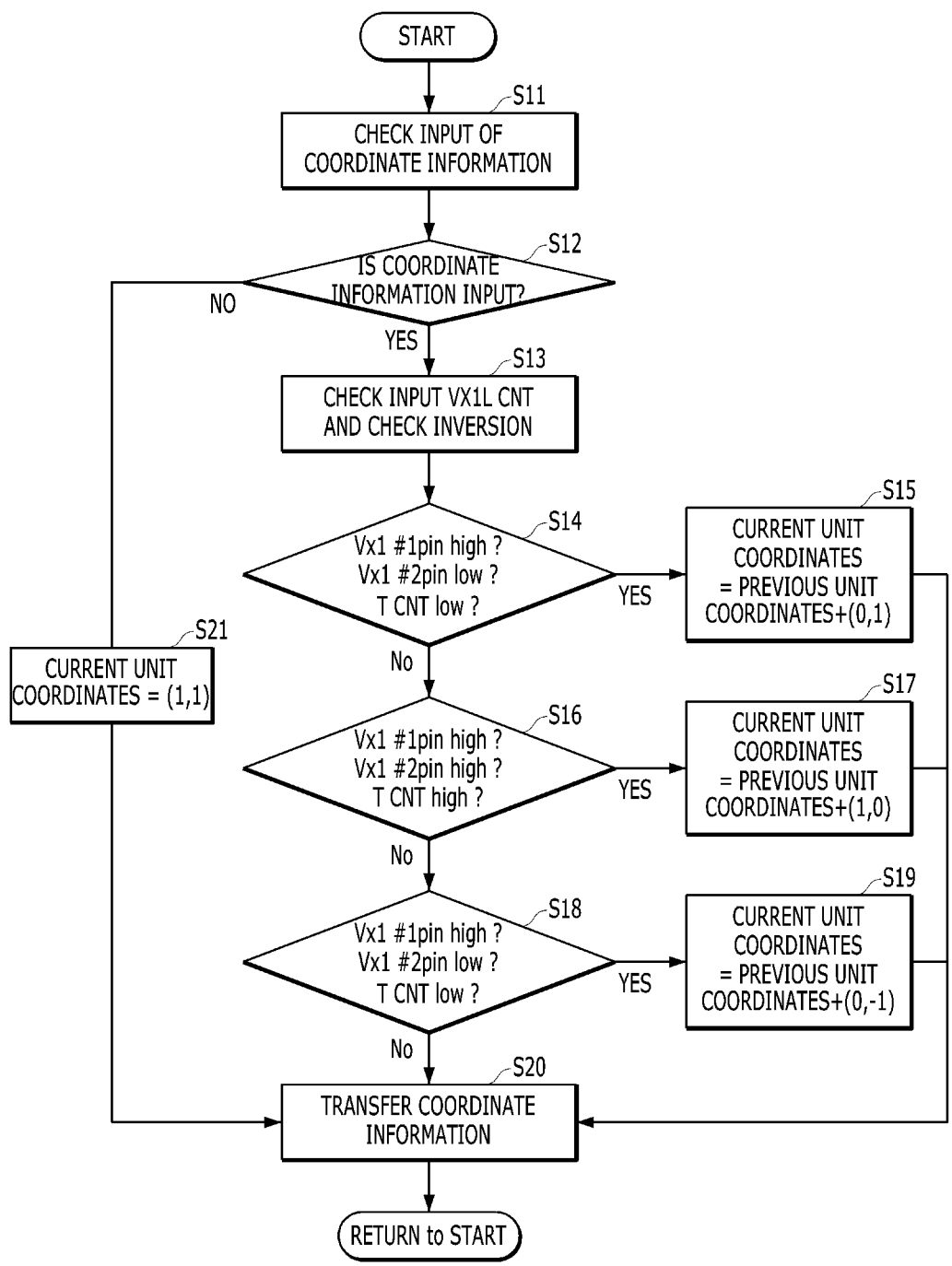

FIGS. 12 to 14 are diagrams illustrating the principle that unit arrangement coordinate information about display units having a two units (width)*two units (height) size is generated.

In FIG. 12, a display unit [1,1] may be a master display unit, and display units [1,2], [2,2], and [2,1] may be slave display units. Unlike the master display unit, each of the slave display units may update coordinate information, received from a previous unit, to coordinate information about a current unit and may transfer the updated coordinate information to a next unit. The master display unit may receive finally updated coordinate information (i.e., unit arrangement coordinate information) fed back from a last slave display unit. Here, the previous unit, the current unit, and the last slave display unit may be designated based on a signal transfer direction of an interface circuit.

Each display unit may include a plurality of connection check pins V×1L #1, V×1L #2, and TCNT and a plurality of secondary pins V×1R #1, V×1R #2, and BCNT. All of the connection check pins V×1L #1, V×1L #2, and TCNT may be connected to a logic low voltage L of 0 V. In the secondary pins V×1R #1, V×1R #2, and BCNT, the secondary pin V×1R #2 may be connected to the logic low voltage L, and the secondary pins V×1R #1 and BCNT may be connected to a logic high voltage H of 3.3 V.

When display units having a two units (width)*two units (height) size are connected to one another, connection check pins V×1L #1 and V×1L #2 of the current unit may be connected to secondary pins V×1R #1 and V×1R #2 of the previous unit. In this case, V×1L #1 may be connected to V×1R #1, and V×1L #2 may be connected to V×1R #2.

When the current unit is connected to the previous unit in the same row, the connection check pin TCNT may not be connected to the secondary check pin BCNT. On the other hand, when the current unit is connected to the previous unit in a different row, the connection check pin TCNT may be connected to the secondary check pin BCNT.

The principle that unit coordinate information is transferred based on the cascading scheme and updated in display units will be described below with reference to FIGS. 12 to 14.

Because the display unit [1,1] is the master display unit, logical combination information about the connection check pins V×1L #1, V×1L #2, and TCNT may be "LLL", and coordinate information may be [1,1].

The display unit [1,2] may be connected to the display unit [1,1] and may receive the coordinate information [1,1]. In the display unit [1,2], the logical combination information about the connection check pins V×1L #1, V×1L #2, and TCNT may be "HHH". The connection check pins V×1L #1 and V×1L #2 may respectively be the logic high voltage H and the logic low voltage L, and thus, it may be checked that the display unit [1,2] is connected to the display unit [1,1]. Also, the connection check pin TCNT may be the logic low voltage L, and thus, it may be checked that the display unit [1,2] is connected to the display unit [1,1] in the same row (i.e., a non-inverted connection). The display unit [1,2] may calculate a coordinate addition value [0,1] on the basis of the logical combination information "HLL" and may add the coordinate addition value [0,1] to coordinate information [1,1] about the previous unit to generate coordinate information [1,2] about the current unit.

The display unit [2,2] may be connected to the display unit [1,2] and may receive the coordinate information [1,2]. In the display unit [2,2], the logical combination information about the connection check pins V×1L #1, V×1L #2, and TCNT may be "HHH". All of the connection check pins V×1L #1 and V×1L #2 may be the logic high voltage H, and thus, it may be checked that the display unit [2,2] is connected to the display unit [2,1]. Also, the connection check pin TCNT may be the logic high voltage H, and thus, it may be checked that the display unit [2,2] is connected to the display unit [2,1] in a different row (i.e., an inverted connection). The display unit [2,2] may calculate a coordinate addition value [1,0] on the basis of the logical combination information "HHH" and may add the coordinate addition value [1,0] to coordinate information [1,2] about the previous unit to generate coordinate information [2,2] about the current unit.

The display unit [2,1] may be connected to the display unit [2,2] and may receive the coordinate information [2,2]. In the display unit [2,1], the logical combination information about the connection check pins V×1L #1, V×1L #2, and TCNT may be "HLL". The connection check pins V×1L #1 and V×1L #2 may respectively be the logic high voltage H and the logic low voltage L, and thus, it may be checked that the display unit [2,1] is connected to the display unit [2,2]. Also, the connection check pin TCNT may be the logic low voltage L, and thus, it may be checked that the display unit [2,1] is connected to the display unit [2,2] in the same row (i.e., a non-inverted connection). The display unit [2,1] may calculate a coordinate addition value [0,-1] on the basis of the logical combination information "HLL" and may add the coordinate addition value [0,-1] to coordinate information [2,2] about the previous unit to generate coordinate information [2,1] about the current unit.

Figure 15:
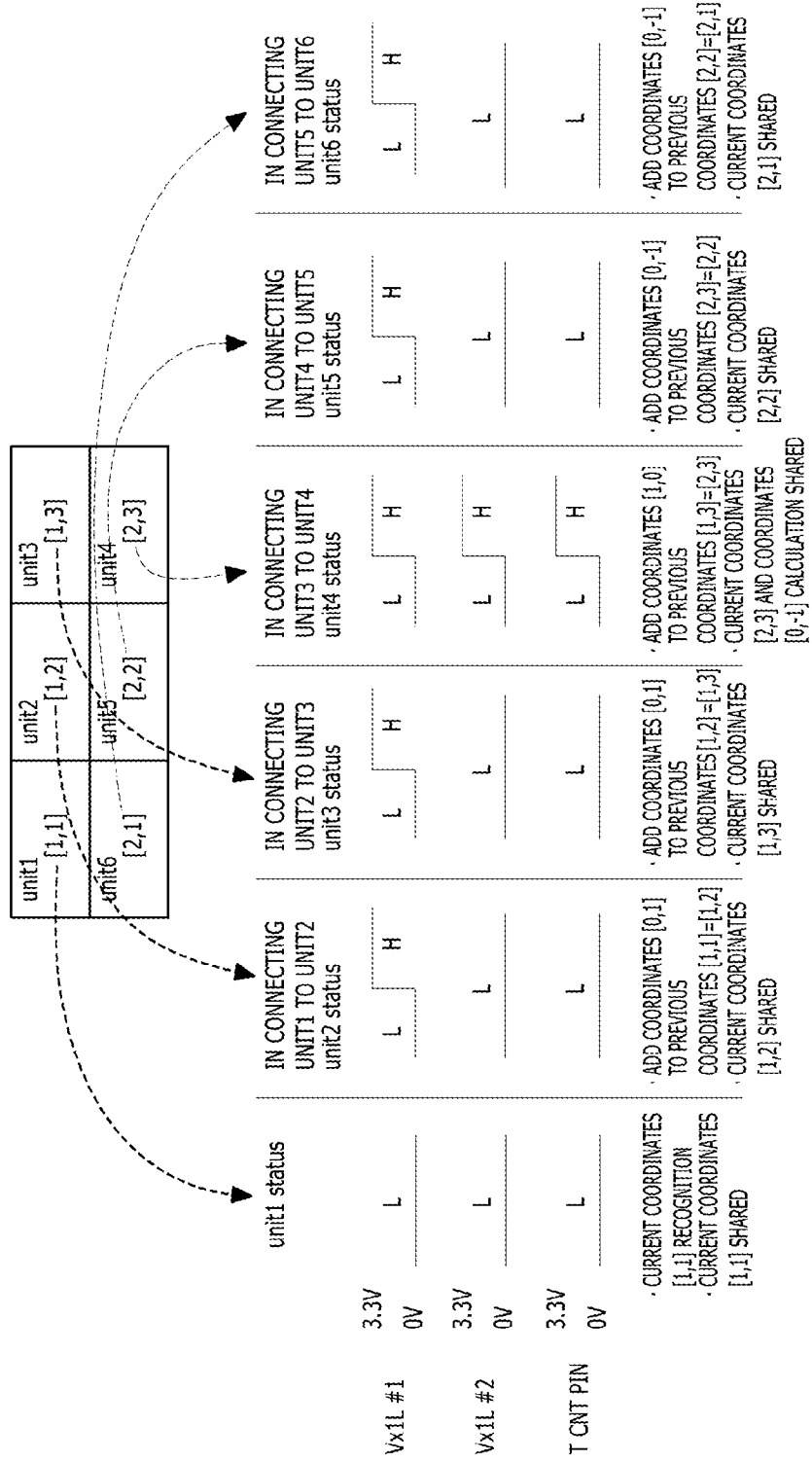
FIG. 15 is a diagram illustrating the principle that unit arrangement coordinate information about display units having a three units (width)*two units (height) size is generated according to an embodiment of the present disclosure.

FIG. 15 is a diagram illustrating the principle that unit arrangement coordinate information about display units having a three units (width)*two units (height) size is generated.

Referring to FIG. 15, in a display unit [1,1], logical combination information about connection check pins V×1L #1, V×1L #2, and TCNT may be "LLL", and coordinate information may be [1,1].

A display unit [1,2] may be connected to the display unit [1,1] and may receive coordinate information [1,1]. When the display unit [1,2] is connected to the display unit [1,1], the logical combination information about the connection check pins V×1L #1, V×1L #2, and TCNT may be "HLL". The display unit [1,2] may calculate a coordinate addition value [0,1] on the basis of the logical combination information "HLL" and may add the coordinate addition value [0,1] to coordinate information [1,1] about a previous unit to generate coordinate information [1,2] about a current unit.

A display unit [1,3] may be connected to the display unit [1,2] and may receive coordinate information [1,2]. When the display unit [1,3] is connected to the display unit [1,2], the logical combination information about the connection check pins V×1L #1, V×1L #2, and TCNT may be "HLL". The display unit [1,3] may calculate a coordinate addition value [0,1] on the basis of the logical combination information "HLL" and may add the coordinate addition value [0,1] to coordinate information [1,2] about the previous unit to generate coordinate information [1,3] about the current unit.

A display unit [2,3] may be connected to the display unit [1,3] and may receive coordinate information [1,3]. When the display unit [2,3] is connected to the display unit [1,3], the logical combination information about the connection check pins V×1L #1, V×1L #2, and TCNT may be "HHH". The display unit [2,3] may calculate a coordinate addition value [1,0] on the basis of the logical combination information "HHH" and may add the coordinate addition value [1,0] to coordinate information [1,3] about the previous unit to generate coordinate information [2,3] about the current unit.

A display unit [2,2] may be connected to the display unit [2,3] and may receive coordinate information [2,3]. When the display unit [2,2] is connected to the display unit [2,3], the logical combination information about the connection check pins V×1L #1, V×1L #2, and TCNT may be "HLL". The display unit [2,2] may calculate a coordinate addition value [0,-1] on the basis of the logical combination information "HLL" and may add the coordinate addition value [0,-1] to coordinate information [2,3] about the previous unit to generate coordinate information [2,2] about the current unit.

A display unit [2,1] may be connected to the display unit [2,2] and may receive coordinate information [2,2]. When the display unit [2,1] is connected to the display unit [2,2], the logical combination information about the connection check pins V×1L #1, V×1L #2, and TCNT may be "HLL". The display unit [2,1] may calculate a coordinate addition value [0,-1] on the basis of the logical combination information "HLL" and may add the coordinate addition value [0,-1] to coordinate information [2,2] about the previous unit to generate coordinate information [2,1] about the current unit.

Figure 16:
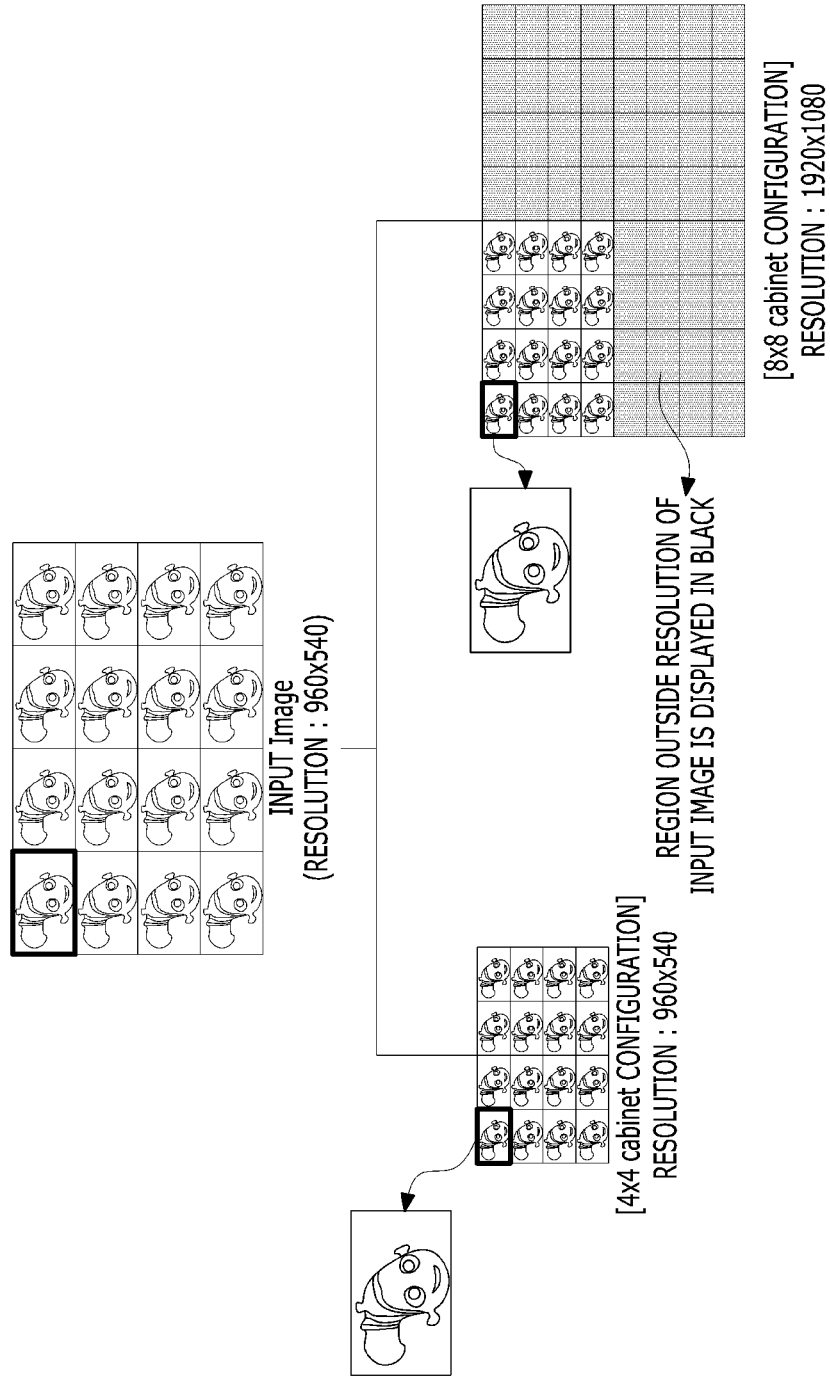
FIG. 16 illustrates a screen display state before an embodiment of the present disclosure is applied.
Figure 17:
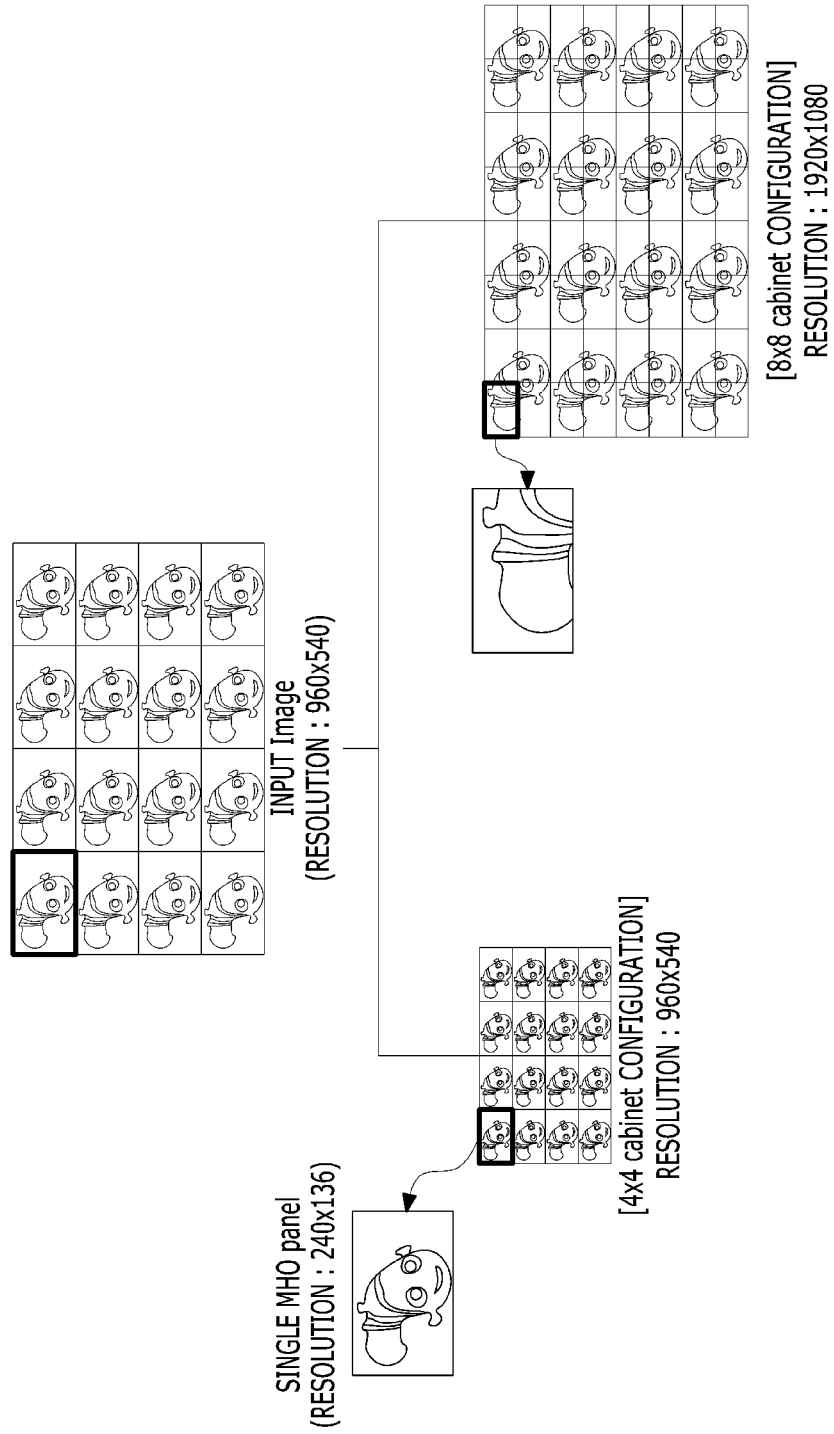
FIG. 17 illustrates a screen display state after an embodiment of the present disclosure is applied.

FIG. 16 illustrates a screen display state before an embodiment of the present disclosure is applied. FIG. 17 illustrates a screen display state after an embodiment of the present disclosure is applied.

When an embodiment of the present disclosure is not applied as in FIG. 16, an input image from a set board may maintain an original resolution regardless of a physical resolution of a cabinet. For example, when a resolution of the input image is 960*540 and the physical resolution of the cabinet is 1920*1080, a region outside the resolution of the input image may be displayed in black. Due to this, the visibility of a user may be reduced.

On the other hand, when an embodiment of the present disclosure is applied as in FIG. 17, a master display unit in the cabinet may scale the resolution of the input image on the basis of the physical resolution of the cabinet. For example, when the resolution of the input image is 960*540 and the physical resolution of the cabinet is 1920*1080, the resolution of the input image may be up-scaled to 1920*1080. As a result, the input image may be displayed to match a screen size of the cabinet.

The present embodiment may realize the following effects.

In the infinitely expandable display apparatus according to the embodiments of the present disclosure, when a resolution mismatch between a set board and display units occurs, one of the display units instead of the set board may perform scaling of an input image. Accordingly, in the embodiments of the present disclosure, the display units may reproduce a normal image even without changing an output resolution of the set board, or a bandwidth of an interface circuit connecting the set board to the display units may be minimized.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An expandable display apparatus comprising:
    a set board outputting image data having a first resolution; and
    a plurality of display circuits arranged in a plurality of rows and a plurality of columns and the plurality of display circuits connected to one another through an interface circuit based on a cascading scheme to display the image data, each of the plurality of display circuits including a first application specific integrated circuit (ASIC) embedded therein,
    wherein the plurality of display circuits comprises:
        a plurality of slave display circuits, each of the plurality of slave display circuits generating unit arrangement coordinate information indicative of a location of the slave display circuit in a particular row from the plurality of rows and a location of the slave display circuit in a particular column from the plurality of columns based on a connection of the interface circuit and at least one slave display circuit of the plurality of slave display circuits transmits the unit arrangement coordinate information indicative of the location of the at least one slave circuit to an adjacent slave display circuit from the plurality of slave display circuits that is located in a same row as the at least one slave circuit; and
        a master display circuit scaling the image data having the first resolution on based on the unit arrangement coordinate information and transferring the scaled image data to the plurality of slave display circuits,
        wherein the master display circuit that scaled the image data and the plurality of slave display circuits display the scaled image data,
    wherein each of the plurality of slave display circuits comprises:
        an interface connection terminal to connect the slave display circuit to the interface circuit; and
        a plurality of connection check pins connected between the interface connection terminal and the first ASIC included in the slave display circuit,
        wherein each of the plurality of connection check pins of the slave display circuit represents logical combination information for the connection check pin that is either a first logic value or a second logic value based on the connection check pin's connection to a previous display circuit from the plurality of display circuits that is connected to the slave display circuit, and a combination of the logical combination information represented by the plurality of connection check pins is indicative of a relative location of the slave display circuit with respect to the previous display circuit and is used by the slave display circuit to generate the unit arrangement coordinate information for the slave display circuit.

2. The expandable display apparatus of claim 1, wherein a first ASIC of the master display circuit calculates a physical second resolution of the plurality of display circuits based on the unit arrangement coordinate information and scales the first resolution of the image data to a second resolution.

3. The expandable display apparatus of claim 1, wherein the plurality of slave display circuits comprises a first slave display circuit and a last slave display circuit based on a signal transfer direction of the interface circuit, and the unit arrangement coordinate information is an updated result while the coordinate information of each slave display circuit is transferred from the first slave display circuit to the last slave display circuits based on the cascading scheme.

4. The expandable display apparatus of claim 3, wherein the unit arrangement coordinate information updated in the last slave display circuit is fed back to the master display circuit through a feedback loop.

5. The expandable display apparatus of claim 1, wherein the first ASIC included in each of the plurality of slave display circuits receives coordinate information about the previous display circuit from the plurality of display circuits through the interface circuit, calculates a coordinate addition value that is indicative of the relative location of the slave display circuit with respect to the previously display circuit based on the combination of the logical combination information about the plurality of connection check pins, adds the coordinate addition value to the coordinate information about the previous display circuit to generate coordinate information about a current display circuit that includes the first ASIC circuit, and transfers the coordinate information about the current display circuit to a next display circuit through the interface circuit.

6. The expandable display apparatus of claim 1, wherein the interface circuit is a unidirectional interface circuit or a bidirectional interface circuit.

7. The expandable display apparatus of claim 6, wherein the unidirectional interface circuit and is implemented via a short-distance wireless communication scheme or a V-by-One (V×1) scheme.

8. The expandable display apparatus of claim 6, wherein the bidirectional interface circuit and is implemented via a short-distance wireless communication scheme or a V-by-One (V×1) scheme.

9. A driving method of an expandable display apparatus including a plurality of display circuits arranged in a plurality of rows and a plurality of columns and the plurality of display circuits connected to one another through an interface circuit based on a cascading scheme, and each of the plurality of display circuits includes an application specific integrated circuit (ASIC) embedded therein, the driving method comprising:
    outputting image data having a first resolution to the plurality of display circuits using a set board;
    determining, by each of a plurality of slave display circuits from the plurality of display circuits, a relative location of the slave display circuit with respect to a previous display circuit from the plurality of display circuits that is connected to the slave display circuit, the relative location determined based a combination of logical information represented by a plurality of connection check pins that are included in the slave display circuit, each connection check pin representing logical combination information for the connection check pin that is either a first logic value or a second logic value based on the connection check pin's connection to the previous display circuit;

generating, by each of the plurality of slave display circuits from the plurality of display circuits, unit arrangement coordinate information indicative of a location of the slave display circuit in a particular row from the plurality of rows and a location of the slave display circuit in a particular column from the plurality of columns based on the determined relative location of the slave display circuit;

transmitting, by at least one slave display circuit of the plurality of slave display circuits, the unit arrangement coordinate information indicative of the location of the at least one slave circuit to an adjacent slave display circuit from the plurality of slave display circuits that is located in a same row as the at least one slave circuit; and scaling, by a master display circuit from the plurality of display circuits, the image data having the first resolution based on the unit arrangement coordinate information, and transferring, by the master display circuit, the scaled image data to the plurality of slave display circuits, wherein the master display circuit that scaled the image data and the plurality of slave display circuits display the scaled image data.

10. The driving method of claim 9, wherein scaling of the image data having the first resolution comprises:

calculating, by the master display circuit, a physical second resolution of the plurality of display circuits based on the unit arrangement coordinate information; and scaling, by the master display circuit, the first resolution of the image data to a second resolution.

11. The driving method of claim 9, wherein generating the unit arrangement coordinate information comprises:

receiving, by each of the plurality of slave display circuits, coordinate information about a previous display circuit from the plurality of display circuits through the interface circuit;

calculating, by each of the plurality of slave display circuits, a coordinate addition value based on the combination of the logical information for the plurality of connection check pins included in each of the plurality of slave display circuits;

adding, by each of the plurality of slave display circuits, the coordinate addition value to the coordinate information about the previous display circuit to generate coordinate information about a current display circuit included in the plurality of display circuits; and transferring, by each of the plurality of slave display circuits, the coordinate information about the current display circuit to a next display circuit included in the plurality of display circuits through the interface circuit.

12. The driving method of claim 9, wherein the unit arrangement coordinate information is an updated result while the coordinate information of each slave display circuit is transferred from the first slave display circuit to a last slave display circuit according to a signal transfer direction based on the cascading scheme.

13. An expandable display apparatus comprising:

a circuit configured to output image data having a first resolution; and a plurality of display circuits arranged in a plurality of rows and a plurality of columns and the plurality of display circuits connected to each other in a cascaded arrangement via an interface circuit, the plurality of display circuits having a second resolution that is different from the first resolution, wherein a first display circuit from the plurality of display circuits is configured to determine a mismatch between the first resolution of the image data and the second resolution of the plurality of display circuits, and scale the image data to have the second resolution rather than the first resolution responsive to the mismatch, wherein each of a plurality of second display circuits from the plurality of display circuits generates unit arrangement coordinate information indicative of a location of the second display circuit in a particular row from the plurality of rows and a location of the second display circuit in a particular column from the plurality of columns based on a connection of the interface circuit and at least one second display circuit of the plurality of second display circuits transmits the unit arrangement coordinate information indicative of the location of the at least one second display circuit to an adjacent second display circuit from the plurality of second display circuits that is located in a same row as the at least one second display circuit, and wherein the first display circuit that scaled the image data and the plurality of second display circuits from the plurality of display circuits are configured to display the scaled image data having the second resolution, wherein each of the plurality of second display circuits comprises:

an application specific integrated circuit (ASIC);

an interface connection terminal to connect the second display circuit to the interface circuit; and a plurality of connection check pins connected between the interface connection terminal and the ASIC, wherein each of the plurality of connection check pins of the second display circuit represents logical combination information for the connection check pin that is either a first logic value or a second logic value based on the connection check pin's connection to a previous display circuit from the plurality of display circuits that is connected to the second display circuit, and a combination of the logical combination information represented by the plurality of connection check pins is indicative of a relative location of the second display circuit with respect to the previous display circuit and is used by the second display circuit to generate the unit arrangement coordinate information for the second display circuit.

14. The expandable display apparatus of claim 13, wherein at least one second display circuit of the plurality of second display circuits is configured to receive, from another display circuit that precedes the at least one second display circuit in the cascaded arrangement, first unit arrangement coordinate information about the other display circuit, and generate second unit arrangement coordinate information about the at least one second display circuit based on the first unit arrangement coordinate information about the other display circuit, and output the second unit arrangement coordinate information to a next display circuit in the cascaded arrangement.

15. The expandable display apparatus of claim 14, wherein a last second display circuit from the plurality of second display circuits in the cascaded arrangement is configured to transmit third unit arrangement coordinate information about the last second display circuit to the first display circuit via a feedback loop, and the first display circuit is configured to calculate the second resolution of the plurality of display circuits based on the third unit arrangement coordinate information received from the last second display circuit.

16. The expandable display apparatus of claim 13, wherein the interface circuit is a unidirectional interface circuit or a bidirectional interface circuit.

17. The expandable display apparatus of claim 16, wherein the unidirectional interface circuit or the bidirectional interface circuit is implemented via a short-distance wireless communication scheme or a V-by-One (V×1) scheme.

* * * * *